United States Patent [19]

Themy

[11] 4,171,256
[45] Oct. 16, 1979

[54] CHLORINE GENERATION APPARATUS

[76] Inventor: Tim Themy, 4984 S. 360 West, Murray, Utah 84106

[21] Appl. No.: 957,566

[22] Filed: Nov. 3, 1978

[51] Int. Cl.² .................. C25B 15/08; C02B 1/82; C25B 9/00

[52] U.S. Cl. .................. 204/239; 204/128; 204/149; 204/241; 204/274

[58] Field of Search .................. 204/236, 275–278, 204/149, 128, 274, 95, 239, 241

[56] References Cited

U.S. PATENT DOCUMENTS

| | | | |
|---|---|---|---|
| 982,493 | 1/1911 | Hickley | 204/239 X |
| 2,466,020 | 4/1949 | Goldberg | 204/277 X |
| 2,489,186 | 11/1949 | Johnson | 204/277 X |
| 3,192,146 | 6/1965 | Vellas et al. | 204/276 X |
| 3,479,275 | 11/1969 | Gwynn et al. | 204/275 |
| 3,616,355 | 10/1971 | Themy et al. | 204/95 X |

Primary Examiner—John H. Mack
Assistant Examiner—D. R. Valentine
Attorney, Agent, or Firm—Phillips, Moore, Weissenberger, Lempio & Majestic

[57] ABSTRACT

A compact chlorine generation device generates chlorine and usually ozone. The device is water cooled. A power transformer has a housing thereabout in heat conductive contact therewith. A highly heat conductive metal frame is attached in direct efficient heat conductive relation with the housing. The frame has a conduit therethrough generally adjacent to the housing. A metal block has a semi-conductor power rectifier held in a cavity therein and in thermal contact therewith. The block is attached in direct heat conductive relation with the frame. A coolant is flowed through the conduit thereby cooling the transformer and the rectifier. A chlorine generating electric cell has an anode and a cathode which are connected to the respective DC output poles of the rectifier. The coolant which exits the conduit is led to the cell wherein it serves as the electrolyte. Outflow liquid from the cell and having an enhanced chlorine level dissolved therein is directed to a reservoir which may be a swimming pool, a health spa, a purified water supply, or the like. The chlorine content of the reservoir is thereby increased to provide a sterilizing and disinfecting action.

9 Claims, 2 Drawing Figures

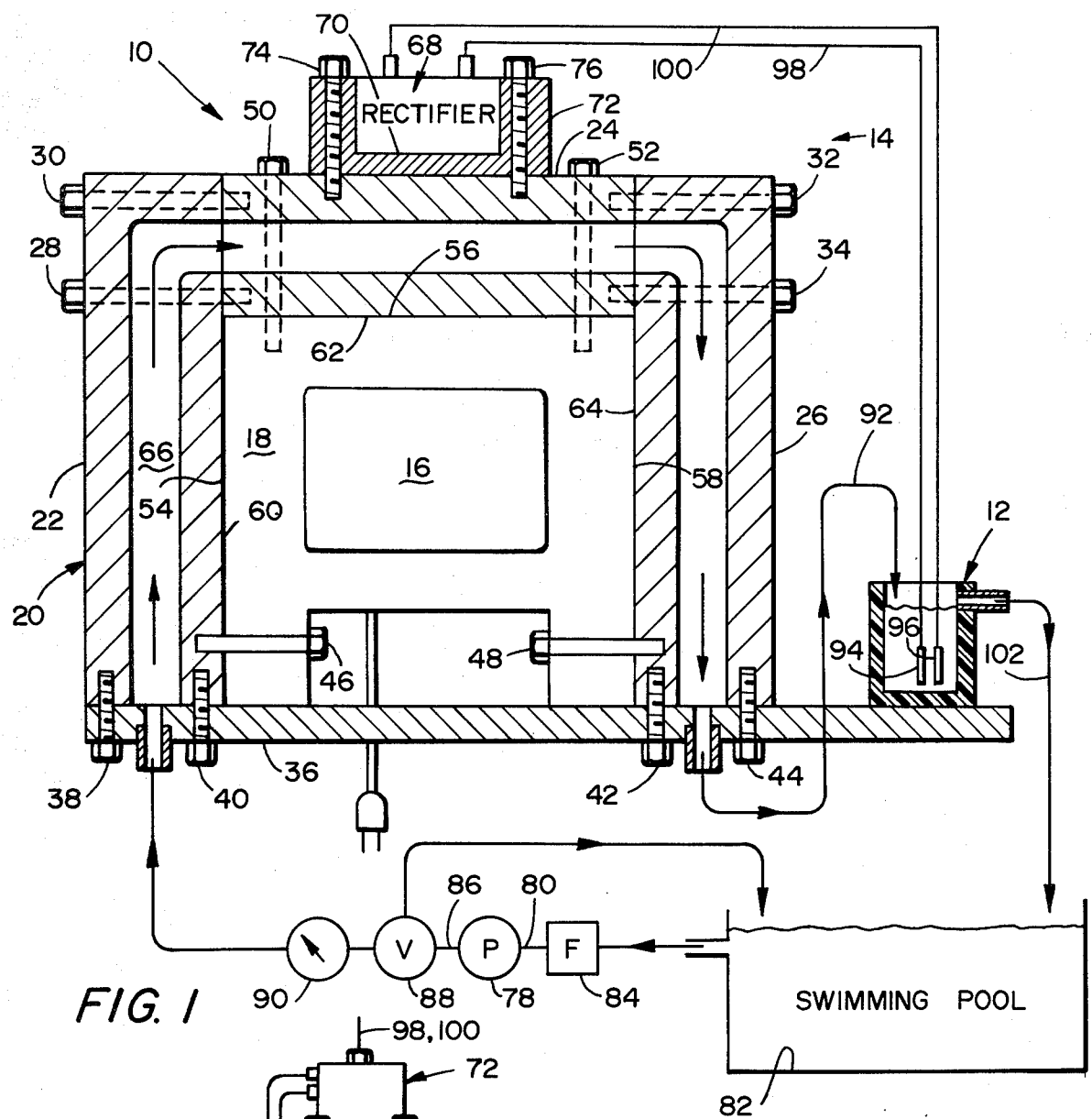
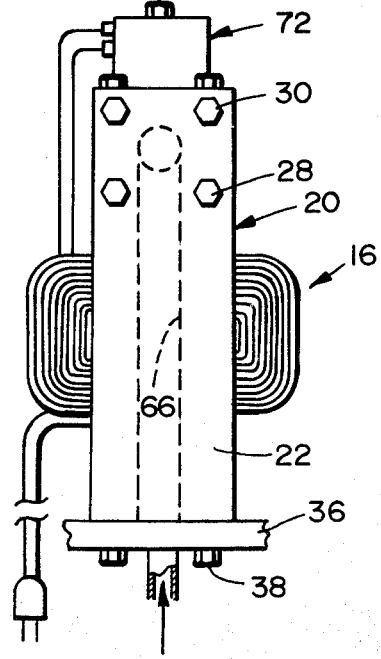

CHLORINE GENERATION APPARATUS

BACKGROUND OF THE INVENTION

1. Field of the Invention

The invention relates to chlorine generating cells which produce chlorine for the treatment of water for sterilization purposes. Such cells are disclosed, for example, in U.S. Pat. No. 3,479,275 issued Nov. 18, 1969 to Ross M. Gwynn and Tim Themy and in U.S. Pat. No. 3,616,355 issued Oct. 26, 1971 to Tim Themy and Ross M. Gwynn. In such cells chlorine and, preferably, ozone are generated and utilized for sterilization and disinfecting purposes. The invention is more particularly related to a compact device which includes such cells in combination with a particular compact power supply.

2. Prior Art

It is well known to electrolytically generate chlorine, sometimes in combination with ozone, for purposes of sterilization or disinfecting of reservoirs such as private swimming pools, health spas, drinking water supplies and the like. Advantageous electrlytic cells are described in detail in the two previously mention U.S. patents. A problem which has existed in prior art devices has been that the power supplies therefor, most especially the transformer and rectifier sections thereof, have been relatively bulky because of the relatively large amount of heat which is generated thereby and the necessity for relatively large air cooling fins which have had to be attached thereto. Not only has the weight of the entire apparatus been increased by such fins, but the overall size of the apparatus has been greatly increased whereby it is often difficult to find a convenient place to conceal the relatively bulky apparatus from view. And, having the apparatus in view is clearly undesirable at a swimming pool or health spa since it detracts from the overall appearance thereof.

Still further, since the use of such cooling fins is not as effective as one might desire, it is normally necessary to use relatively highly rated transformer and rectifier sections so as to assure that they will not burn out in use. This also increases the weight, size and cost of the overall apparatus. Forced air cooling devices such as fans or the like may be utilized to make the air cooling somewhat more efficient, but this is never really a satisfactory solution to the problem, and, it also increases the cost and size of the overall apparatus.

SUMMARY OF THE INVENTION

The present invention is directed to solving the aforementioned problem.

A compact device is provided in accordance with the present invention for generating chlorine for disinfecting use in reservoirs, swimming pools, health spas and the like. The device comprises, in combination, a power transformer having a housing thereabout in heat conductive contact therewith. The device further comprises a highly heat conductive metal frame attached in direct efficient heat conductive relation with the housing, the frame having a conduit therethrough generally adjacent to the housing. A metal block is provided having a cavity therein. A semi-conductor power rectifier is held in the cavity in thermal contact with the block. Means are provided for attaching the block in direct heat conductive relation with the frame. Means are provided for flowing an aqueous coolant through the conduit for cooling the frame and thereby cooling both the transformer and the rectifier. A chlorine generating electric cell has an anode and a cathode and means are provided for connecting an output from the rectifier to the anode and the cathode. Means are also provided for conducting the coolant into the cell where it serves as the electrlyte therein and, means are provided for conducting overflow coolant having an enhanced chlorine level therein from the cell to an aqueous liquid containing reservoir to increase the chlorine content in the reservoir and thereby provide a sterilizing action.

BRIEF DESCRIPTION OF THE DRAWINGS

The invention will be better understood by reference to the drawing, in the figures of which like numbers denote like parts throughout and wherein:

FIG. 1 illustrates in side sectional view, an apparatus in accordance with a preferred embodiment of the present invention; and FIG. 2 illustrates a side view taken from the left of FIG. 1 and viewing rightwardly.

DETAILED DESCRIPTION OF THE PREFERRED EMBODIMENT

A chlorine generating device 10 is illustrated in the figures of the drawing. Chlorine, and usually ozone, is generated in an electrolytic cell 12 shown schematically at the righthand side of FIG. 1. Briefly, the cell is filled with an aqueous liquid, generally a dilute solution of sodium chloride. Within the cell, chlorine and/or ozone are generated in the manner described in U.S. Pat. Nos. 3,479,275 and 3,616,355.

The lefthand portion of FIG. 1 illustrates a water cooled power generating section 14 in accordance with the present invention. The power generating section 14 comprises a power transformer 16 having a housing 18 thereabout in heat conductive contact therewith. As will be noted from FIG. 1, the housing 18 is generally rectangular in at least one cross-section. Such transformers are standard, off-the-shelf items.

In accordance with the present invention, a highly heat conductive metal frame 20, generally made of aluminum to minimize weight and corrosion problems, is attached in direct efficient heat conductive relation with the housing 18. In the embodiment illustrated the frame 20 comprises three frame members 22, 24 and 26 with the member 24 serving as a bridge between the members 22 and 26. The three frame members are connected to one another by appropriate bolts, 28, 30, 32 and 34. The frame 20 is also preferably attached to a base plate 36 by bolts 38, 40, 42 and 44. Thus, a rigid structure is provided in which the transformer 16 can sit in snug conductive fit. The transformer 16, is attached within the frame 20 by bolts 46, 48, 50 and 52. It is important that the three sides 54, 56 and 58 of the transformer 16 be attached in mating direct efficient heat conductive contact with interior walls 60, 62 and 64 defined by the frame 20.

A conduit 66 is defined by, and passes through, the frame 20. The conduit runs generally parallel to the three sides 54, 56 and 58 of the frame 20. Thus, flowing liquid is passed adjacent each of the sides 54, 56 and 58 of the housing 18 to provide efficient cooling thereof and thus of the power transformer 16.

A semi-conductor power rectifier 68 is placed within a cavity 70 in a highly heat conductive metal block 72. The metal block 72, which is generally made of aluminum, is fastened to the frame 20 by appropriate bolts 74 and 76. Generally the metal block 72 is attached to the frame 20 opposite one of the sides of the housing 18. The rectifier 68 fits within the cavity 70 in mating efficient thermal contact with the metal block 72. Thus, the rectifier 68, which would generally be of the conventional push-pull variety, is cooled by contact with the frame 20 just as the transformer 16 is cooled. AC current from the secondary of the transformer 16 is passed to the rectifier 68 wherein it is converted to DC current.

Means are provided for flowing an aqueous coolant through the conduit 66 for cooling the frame 20 and thereby cooling both the transformer 16 and the rectifier 68. In the particular embodiment illustrated the flowing means comprises a pump 78 which has an input 80 communicating with a reservoir 82, which may be, for example, a swimming pool, generally via a filter 84. The pump 80 has an output 86 which communicates via a valve 88 and a flow meter 90 with the conduit 66. Usually only a portion of the water being pumped by the pump 78 would be passed into the conduit 66 while the rest thereof would be returned directly to the swimming pool 82 by the valve 88.

Generally, the pump 78 or other flowing means would provide a flow rate as measured by the flow meter 90 through the conduit 66 of at least about 1 gallon per minute, preferably at least about 3 gallons per minute and most preferably of the order of 8 to 12 gallons per minute. If desired, tap water may be used as the flowing means in which case it will serve as make-up water to replace evaporative losses.

Water which exits the conduit 66 passes as indicated by a line 92 into the cell 12. Thus, the line 92 serves as means for conducting the coolant which passes through the conduit 66 into the cell 12 where the coolant serves as the electrolyte in the cell 12. The cell 12 has both an anode 94 and a cathode 96 therein. Chlorine and usually ozone are produced in the cell 12 as DC current is passed through the electrolyte-coolant therein. Leads 98 and 100 connect the DC output of the rectifier 68 to the anode and cathode. Overflow coolant passes from the cell 12 as indicated by a line 102 to the reservoir 82. The overflow coolant has an enhanced chlorine level therein and often an enhanced ozone level therein with the chlorine and usually ozone having been formed within the cell 12. Thus, a sterilizing or disinfecting action is provided for the water in the reservoir 82.

Through utilizing an apparatus as just described, it has been found that a transformer normally rated at 70 amps can be used with up to 500 amps current (at the same 15 volts) of normal operation, without any damage to the transformer. Similarly, the rectifier circuit can handle much larger currents at constant voltage without any harm thereto. The overall apparatus is quite compact since no fins are needed for air cooling. Further, in view of the relatively high rate of liquid flow through the conduit 66, the temperature of the aqueous liquid flowing therethrough does not vary significantly, generally no more than 1° centigrade and in any event no more than about 5° centigrade, at most. This is important as ozone production is adversely effected by high temperatures. The overall system is quite efficient, utilizing the normal pump found on a swimming pool or the like to supply the water flow, thus, keeping down cost of the apparatus. Because of the ability to use a relatively small transformer for relatively heavy loads, and the elimination of the necessity for large cooling fins, the entire apparatus can be quite compact and can be easily hidden near a swimming pool or health spa.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A compact device for generating chlorine for sterilizing use in swimming pools, health spas, water supplies, and the like, comprising, in combination:
   a power transformer having a housing thereabout in heat conductive contact therewith;
   a highly heat conductive metal frame attached in direct efficient heat conductive relation with said housing, said frame having a conduit therethrough generally adjacent to said housing;
   a metal block having a cavity therein;
   a semi-conductor power rectifier held in said cavity in thermal contact with said block;
   means for attaching said block in direct heat conductive relation with said frame;
   means for flowing an aqueous coolant through said conduit for cooling said frame and thereby cooling both said transformer and said rectifier;
   a chlorine generating electrolytic cell having an anode and a cathode;
   means for connecting an output from said rectifier to said anode and said cathode;
   means for conducting said coolant into said cell where it serves as the electrolyte therein; and
   means for conducting overflow coolant having enhanced chlorine level therein from said cell to an aqueous liquid containing reservoir to increase the chlorine content in said reservoir and thereby provide a sterilizing action.

2. A device as in claim 1, wherein said reservoir is a recreational pool.

3. A device as in claim 2, wherein said flowing means comprises a pump having an input communicating with said pool and an output communicating at least a portion of the flow from said pump to said conduit.

4. A device as in claim 1, wherein said flowing means provides a flow rate through said conduit of at least about 1 gallon per minute.

5. A device as in claim 1, wherein said housing is generally rectangular in at least one cross-section, wherein said frame is attached against at least three sides defined by said housing and wherein said conduit runs generally parallel to said three sides of said housing.

6. A device as in claim 5, wherein said reservoir is a recreational pool.

7. A device as in claim 6, wherein said flowing means provides a flow rate through said conduit of at least about 1 gallon per minute.

8. A device as in claim 7, wherein said flowing means comprises a pump having an input communicating with said pool and an output communicating at least a portion of the flow from said pump to said conduit.

9. A device as in claim 8, wherein said block attaching means attaches said block generally opposite one of said sides of said housing.

* * * * *